United States Patent
Nishiura et al.

(10) Patent No.: US 8,170,309 B2
(45) Date of Patent: May 1, 2012

(54) IMAGE PROCESSING APPARATUS AND METHOD THEREOF

(75) Inventors: Masahide Nishiura, Machida (JP); Tomoyuki Takeguchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 374 days.

(21) Appl. No.: 12/360,277

(22) Filed: Jan. 27, 2009

(65) Prior Publication Data
US 2009/0196474 A1 Aug. 6, 2009

(30) Foreign Application Priority Data

Jan. 31, 2008 (JP) ................. 2008-021456

(51) Int. Cl.
*G06K 9/00* (2006.01)
*A61B 5/05* (2006.01)
(52) U.S. Cl. .............. 382/128; 600/411; 600/427
(58) Field of Classification Search ............ 382/128, 382/129, 130, 131, 132, 133, 134, 159, 164, 382/173, 190; 378/4, 21–27, 62, 101, 901; 600/407, 410, 411, 425, 427, 508, 509, 512, 600/514; 128/916, 920, 922; 514/16.4
See application file for complete search history.

(56) References Cited

U.S. PATENT DOCUMENTS

| | | | | |
|---|---|---|---|---|
| 5,734,739 A | * | 3/1998 | Sheehan et al. | 382/128 |
| 6,346,124 B1 | * | 2/2002 | Geiser et al. | 600/450 |
| 6,917,826 B2 | * | 7/2005 | Wei et al. | 600/407 |
| 7,352,888 B2 | * | 4/2008 | Luo et al. | 382/132 |
| 2005/0238233 A1 | | 10/2005 | Mulet Parada et al. | |
| 2006/0171586 A1 | | 8/2006 | Georgescu et al. | |

FOREIGN PATENT DOCUMENTS

| | | |
|---|---|---|
| JP | 10-099334 | 4/1998 |
| JP | 2000-217818 | 8/2000 |

OTHER PUBLICATIONS

Cootes, et al, Active Shape Models—Their Training and Application, Computer Vision and Image Understanding, vol. 61, No. 1, pp. 38-59, Jan. 1995.
Extended European Search Report for European Application No. 09250141.0 mailed on Sep. 26, 2011.
Chinese Office Action for Chinese Patent Application No. 200910126713.1 mailed on Nov. 9, 2011.

* cited by examiner

*Primary Examiner* — Abolfazl Tabatabai
(74) *Attorney, Agent, or Firm* — Turocy & Watson, LLP

(57) ABSTRACT

A position specifying unit specifies three diagnostic positions corresponding to respective vertexes of a reference triangle on a myocardial boundary in a diagnostic image, a calculating unit matches three training positions with the three diagnostic positions for each of a plurality of training images and compares the diagnostic image with training myocardial area boundary data to obtain a similarity, and an output unit outputs training myocardial area boundary data having the highest similarity.

13 Claims, 5 Drawing Sheets

IMAGE PROCESSING APPARATUS AND METHOD THEREOF

CROSS-REFERENCE TO RELATED APPLICATION

This application is based upon and claims the benefit of priority from Japanese Patent Application No. 2008-21456, filed on Jan. 31, 2008; the entire contents of which are incorporated herein by reference.

FIELD OF THE INVENTION

The present invention relates to an image processing apparatus, an image processing method and an image processing program.

DESCRIPTION OF THE BACKGROUND

A segmentation technology and a contour extraction technology for identifying an area of myocardium are important as an image processing technology which supports diagnosis of cardiac diseases.

In JP-A 2000-217818 (KOKAI), a method of extracting the contour of a left ventricle using the annular position in a cross-sectional image of a heart as an anatomical feature is disclosed.

In JP-A 10-99334 (KOKAI), a method of coordinating contours using anatomical features such as the annulus or papillary muscle is described.

However, when performing the segmentation (or extraction of the contour) of the cardiac muscle by a short-axis image of the left ventricle, there is a case in which the anatomical features cannot be used. Depending on the cross-sectional position of the short-axis image, there is a case in which the papillary muscle which might be the anatomical feature is not included in the image. In such a case, the anatomical features cannot be used. The position of the papillary muscle by itself varies depending on differences among individuals, and hence it cannot be a reliable feature. In such a case, the myocardial segmentation using the anatomical features cannot be performed.

As described above, the related art has a problem such that there is a case in which the myocardial segmentation using the anatomical features cannot be performed.

SUMMARY OF THE INVENTION

In order to solve the problem as described above, it is an object of the invention to provide an image processing apparatus which enables myocardial segmentation even when an anatomical feature is not present on an image, and a method thereof.

According to embodiments of the invention, there is provided an image processing apparatus including: a dictionary configured to store training data, the training data being data relating to each of a plurality of training images of an training heart and including training myocardial area boundary data of the training hearts, the training myocardial area boundary data being data corresponding to three training positions which are specified on a myocardial boundary of the training heart, and the three training positions having a relation with positions of three vertexes of a predetermined reference triangle; an image input unit configured to enter a diagnostic image of a diagnostic heart; a position specifying unit configured to specify three diagnostic positions corresponding to the respective vertexes of the reference triangle so as to be similar to a like figure of the reference triangle on the myocardial boundary of the diagnostic hearts in the diagnostic image; a calculating unit configured to obtain a similarity by matching the three training positions and the three diagnostic positions of the respective plurality of training images and comparing the diagnostic image and the training myocardial area boundary data, and an output unit configured to output the training myocardial area boundary data having the highest similarity as a myocardial area boundary data of the diagnostic heart.

According to another aspect of the invention, there is also provided an image processing apparatus including a dictionary configured to store training data, the training data being data relating to each of a plurality of training images of an training heart and including training myocardial area boundary data of the training hearts, the training myocardial area boundary data being data corresponding to two training positions which are specified on a myocardial boundary of the training heart, and the two training positions having a relation with positions of both ends of a predetermined reference straight line; an image input unit configured to enter a diagnostic image of a diagnostic heart; a position specifying unit configured to specify two diagnostic positions corresponding to the reference straight line on the myocardial boundary of the diagnostic hearts in the diagnostic image; a calculating unit configured to obtain a similarity by matching the two training positions and the two diagnostic positions and comparing the diagnostic image and the training myocardial area boundary data; and an output unit configured to output the training myocardial area boundary data having the highest similarity as myocardial area boundary data of the diagnostic heart.

According to the aspects of the invention, the myocardial segmentation is enabled even with a cross-sectional image having no clear anatomical feature.

DETAILED DESCRIPTION OF THE INVENTION

First Embodiment

Referring now to FIG. 1 to FIG. 5, an image processing apparatus 10 as a myocardial segmentation apparatus according to a first embodiment of the invention will be described.

Figure 1:
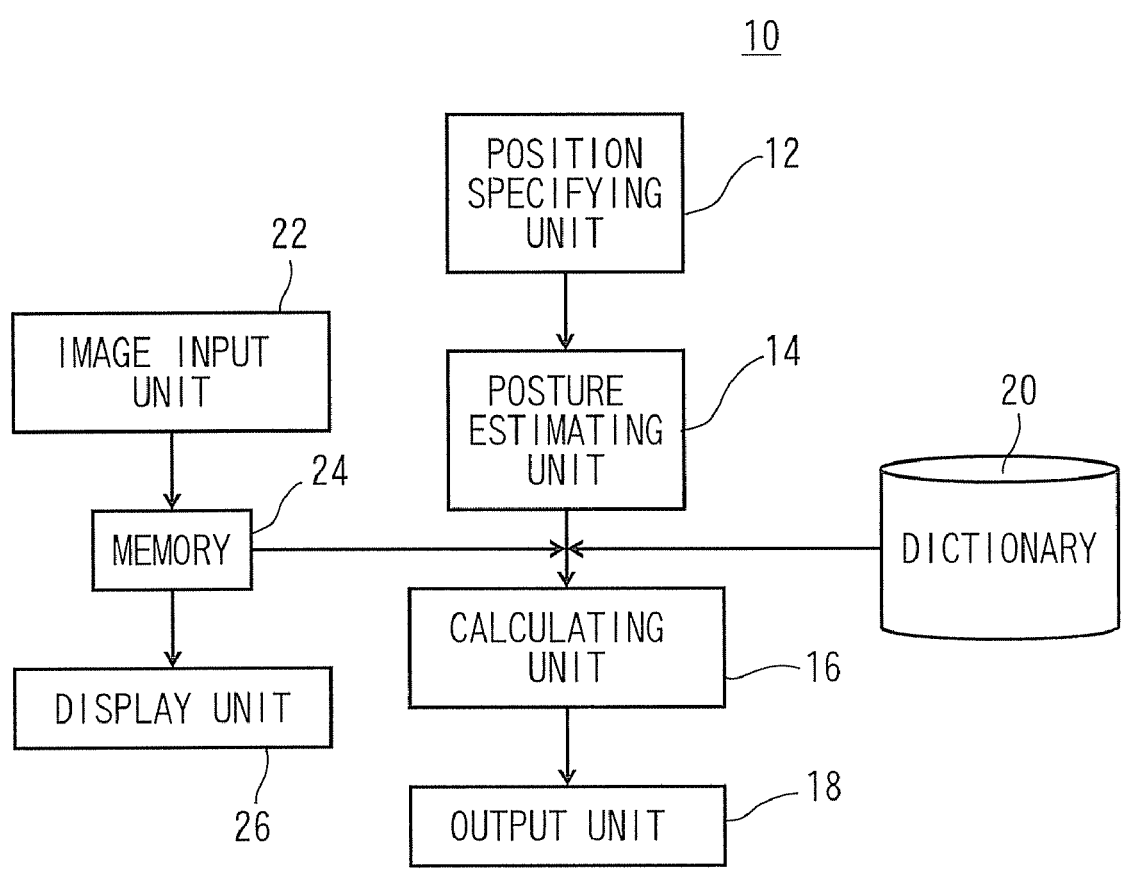
FIG. 1 is a block diagram showing a configuration of an image processing apparatus according to a first embodiment of the invention.

FIG. 1 is a block diagram showing the image processing apparatus 10 configured to perform a heart analysis according to the first embodiment. The image processing apparatus 10 may include an image input unit 22 configured to accept an entry of an image; a memory 24 configured to store the image; a display unit 26 configured to display the image; a position specifying unit 12 configured to specify positions on the image; a posture estimating unit 14 configured to estimate the posture of a heart on the image using the specified positions; a first calculating unit 16 configured to extract the shapes of inner and outer myocardial boundaries using training data which is learned in advance; an output unit 18 configured to output segmented boundary shape data; and a dictionary 20 configured to store the training data.

The image processing apparatus 10 can be realized by using, for example, a multi-purpose computer apparatus as basic hardware. In other words, the position specifying unit 12, the posture estimating unit 14, the first calculating unit 16, and the output unit 18 are realized by causing a processor mounted on the computer apparatus to execute a program. At this time, the image processing apparatus 10 may be realized by installing the program in the computer apparatus in advance. The image processing apparatus 10 may also be realized by storing the program in a storage medium such as a CD-ROM or by distributing the program via a network and installing the program in the computer apparatus as needed. The memory is realized by using a memory or a hard disk integrated in or attached externally to the computer apparatus, or storage medium such as a CD-R, a CD-RW, a DVD-RAM, and a DVD-R as needed.

Figure 2:
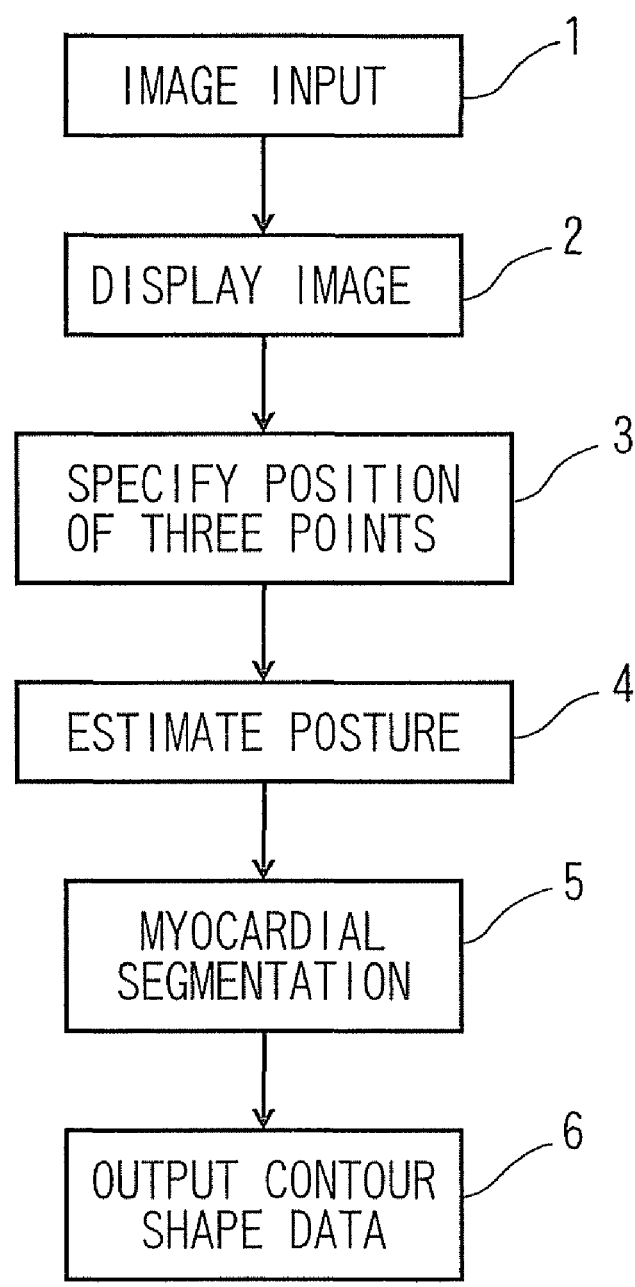
FIG. 2 is a flowchart showing an operation thereof.

Referring now to FIG. 1 and FIG. 2, an operation of the image processing apparatus 10 will be described. FIG. 2 is a flowchart showing the operation of the image processing apparatus 10.

A training process will now be described. A process of training the training data in the dictionary 20 is performed as a preprocess of the myocardial segmentation. The process of training the training data does not have to be performed at the time of myocardial segmentation.

The position specifying unit 12 also serves as the position specifying unit 12 for training used at the time of training and the first calculating unit 16 also serves as a calculating unit for training at the time of training.

A procedure of the process of training the training data will be described below.

First of all, a reference triangle showing a positional relation of three points specified on a myocardial boundary is determined.

The reference triangle is specified according to a cross-sectional category which is a shape of a cardiac muscle as an object of extraction.

The shape of the cardiac muscle varies depending on the position of the cross-section to be observed. For example, in the case of the short-axis cross-sectional image in which the shape of the cardiac muscle is close to a circle, by specifying a regular triangle as the reference triangle, vertexes are arranged on a circumference without deviation, and hence the accuracy is effectively improved.

In the case of the long-axis cross-sectional image, by specifying an isosceles triangle or an acute triangle as the reference triangle, both ends of the cardiac muscle are covered, and hence the accuracy is effectively improved.

In this manner, efficiency is improved by switching the reference triangle depending on the cross-sectional category.

Figure 3:
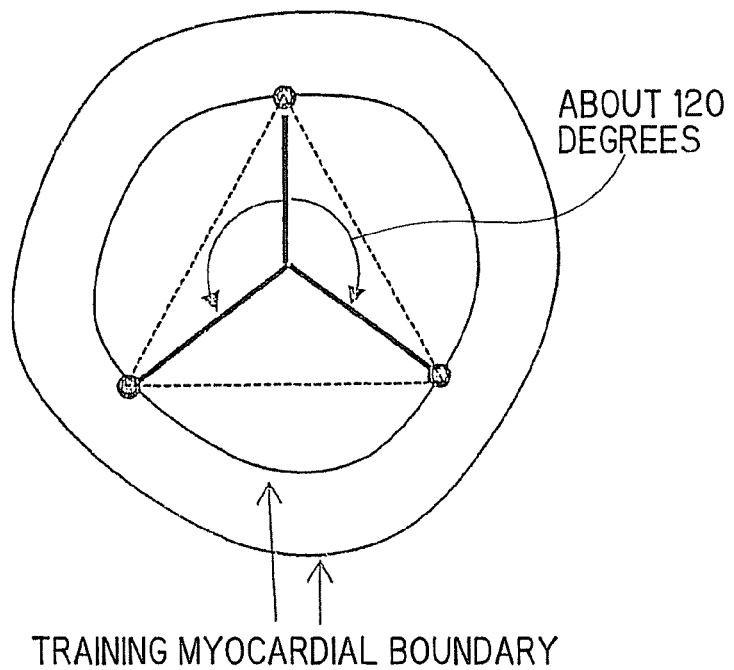
FIG. 3 is a drawing for explaining three-point specification in a short-axis image of a heart when creating a dictionary.

Subsequently, a user prepares a plurality of training images of a training heart. Then, the user specifies three training positions on the training myocardial area boundaries in the respective training images, that is, the positions of the vertexes of the triangle, using the position specifying unit 12 so as to be similar to a like figure of the reference triangle. In FIG. 3, a case in which the reference triangle is a regular triangle in the short-axis cross-sectional image is shown.

In this case, the user specifies the positions of the three points on the training myocardial boundaries in the training images so as to be similar to a regular triangle. The positions of the three points do not have to be the anatomical features.

Subsequently, the first calculating unit 16 uses the training myocardial area boundary data corresponding to at least the three training positions in the respective training images and prepares the training data to be stored in the dictionary 20.

The first calculating unit 16 obtains a coordinate conversion expression which makes the three training positions in the training images overlap with the positions of the vertexes of a predetermined normalization triangle. The term "normalization triangle" has a different concept from the reference triangle. It is a concept generated for facilitating comparison by normalizing a diagnostic image, described later, and the training images when obtaining the similarity of these images. The normalization triangle is composed of three coordinate positions present in a virtual normalization coordinate system, and the shape thereof does not necessarily have to be a like figure of the reference triangle, but may be of a different shape. The coordinate conversion expression is an expression to convert from a coordinate system of the training images to the normalization coordinate system.

Then, the first calculating unit 16 normalizes the coordinates of the training contour shape data in the training images by the coordinate conversion expression and learns the contour shape.

For the training of the contour shape, for example, a general Active Shape Model (see T. F. Cootes, C. J. Taylor, D. H. Cooper and J. Graham, "Active shape models—their training and application", Computer Vision and Image Understanding, 61(1):38-59, January 1995) may be used.

In the Active Shape Model, the distribution of contour shape and a luminance profile of an image around the contour are learned as the training contour shape data.

In the training of the distribution of contour shape, for example, the principal components of distribution of vectors in which coordinate data of the vertexes which express the contour are arranged are analyzed, and superior shape vectors having large characteristic values are stored in the dictionary 20 as the contour shape data.

In training of the luminance profile of the image, for example, the principal components of distribution of image luminance data (luminance profile) on the straight line which is orthogonal to the contour are analyzed, and the results of analysis are stored in the dictionary 20 as the luminance profile.

In the training process as described above, training of the contour shape with reference to the three points specified by the position specifying unit 12 is performed for each of the plurality of training images, so that the training data is created. In other words, the contour training including also the distribution of postures of the cardiac muscle in the images is performed.

The first calculating unit 16 stores the created training data in the dictionary 20, and uses the same for the process of myocardial segmentation, described later.

Subsequently, a procedure of the myocardial segmentation will be described.

First of all, a diagnostic image of a diagnostic heart is stored in the memory 24 by the image input unit 22 (Step 1 in FIG. 2). The diagnostic image may be entered from a medical image diagnostic apparatus such as an ultrasonic diagnostic apparatus, an X-ray CT apparatus, or an MRI apparatus, or an image stored in an image server or the like may be entered as an entry.

The diagnostic image stored in the memory 24 is displayed on the display unit 26 (Step 2 in FIG. 2).

The user specifies three diagnostic positions on the myocardial boundary of the diagnostic heart using the position specifying unit 12 while referring to the displayed diagnostic image (Step 3 in FIG. 2). The three diagnostic positions to be specified are arranged so as to be similar to a like figure of the predetermined reference triangle on the myocardial boundary.

Figure 4:
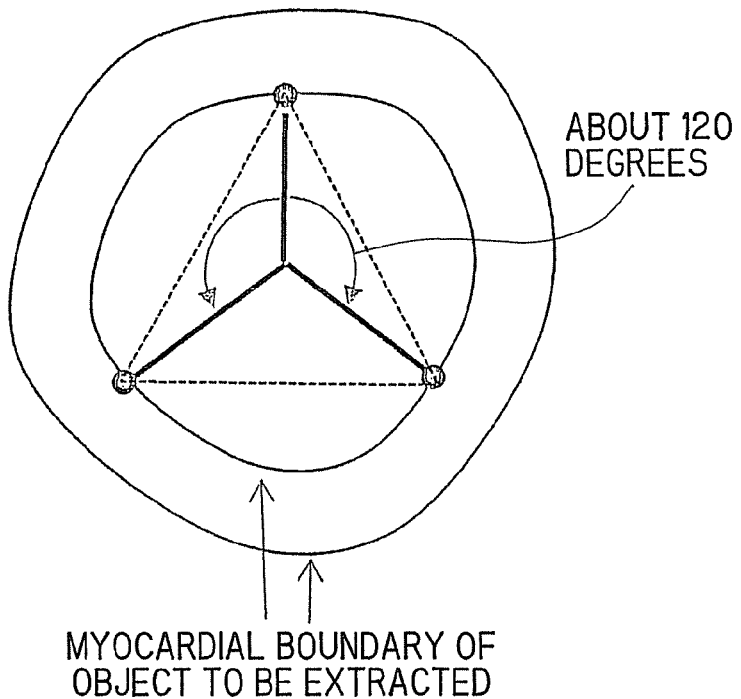
FIG. 4 is a drawing for explaining the three-point specification in the short-axis image of the heart.

For example, there is a case where the anatomical features are not clear in the short-axis image of the hearts in the diagnostic image as shown in FIG. 4. In such a case, the user specifies an uppermost point of the myocardial boundary and two points which are apart from the uppermost point, for example, by an angle of about 120 degrees.

Figure 5:
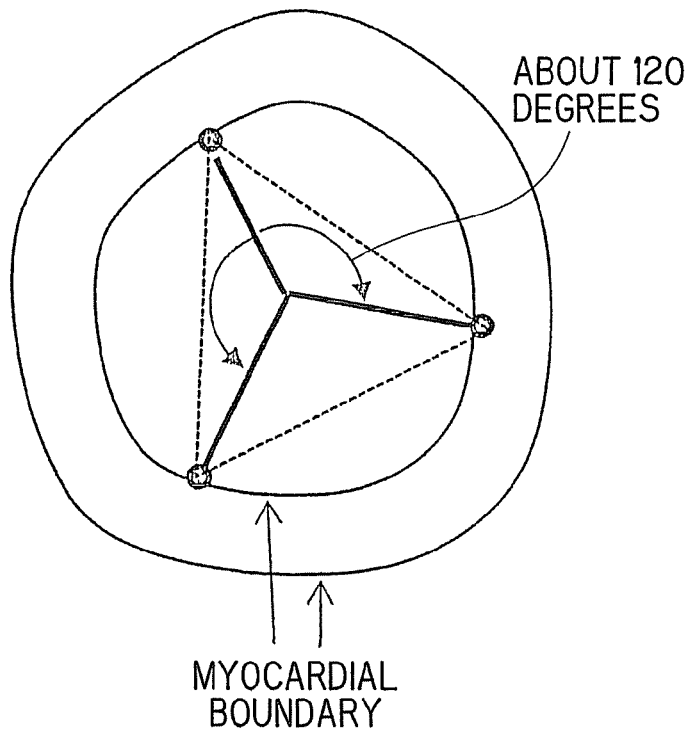
FIG. 5 is a drawing for explaining the three-point specification when a user intentionally enters a posture of a heart in the short-axis image of the heart.

There is also a case where the anatomical features are not clear, but the user is able to determine a turned posture of the short-axis image approximately as shown in FIG. 5. In such a case, the user specifies three points in a state in which the three points (the vertexes of the reference triangle) to be entered are rotated so as to match the angle of rotation.

When entering the three diagnostic positions, the position specifying unit 12 may be adapted to display an icon on the display unit 26 so as to serve as a guide for the relation of the positions to be entered. For example, the position specifying unit 12 displays a Y-shaped or a triangle icon shown in FIG. 4 for guiding approximate angles of three points. Accordingly, entry in accordance with the positional relationship of the triangle is easily achieved by the user.

The positional relationship of the three diagnostic points may be specified by one of the uppermost position, the lowermost position, the rightmost position, and the leftmost position in the image coordinate system of the diagnostic image on the myocardial boundary, and other two points on the myocardial boundary so as to achieve the positional relationship which are similar to a like figure of the reference triangle. For example, when an ultrasonic image is obtained transthoracically, the rough posture of the heart is under a certain constant conditions such that the front wall of the heart appears on the upper portion of the image in many cases. In such a case, by the determination of the positional relationship as described above, a further stable myocardial segmentation is achieved.

Then, the posture estimating unit 14 obtains a coordinate conversion expression which makes the specified three diagnostic positions in the diagnostic image overlap with the positions of the vertexes of the normalization triangle of the normalization coordinate system used for training.

This coordinate conversion expression is obtained by calculating an affine transformation matrix from the relationship between the coordinates of the three diagnostic positions and the vertex coordinates of the normalization triangle, for example.

This coordinate conversion expression is obtained by calculating parameters of the position, scale, and rotation from the relationship between the coordinates of the three diagnostic positions and the vertex coordinates of the normalization triangle.

This means that the posture estimating unit 14 calculates the coordinate conversion expression to obtain postures such as the position, scale, and the rotational angle of the cardiac muscle on the diagnostic image (Step 4 in FIG. 2).

The first calculating unit 16 extracts the three diagnostic positions in the diagnostic image specified by the position specifying unit 12, the diagnostic image, and the myocardial boundary contour from the training image (Step 5 in FIG. 2). Active Shape Mode will be described below.

First of all, the first calculating unit 16 converts the training contour shape data of one of the training data in the dictionary 20 into coordinates on the diagnostic image. This conversion is performed by the positions of the respective vertexes of the normalization triangle and the reverse conversion of the coordinate conversion expression obtained by the posture estimating unit 14.

Subsequently, the first calculating unit 16 obtains the similarity between the luminance profile around the contour in the diagnostic image and the luminance profile of the training contour shape data.

Subsequently, the first calculating unit 16 repeats the same process for all the contour shape data relating to the plurality of training images stored in the dictionary 20.

Then, the first calculating unit 16 searches a contour shape data having the highest similarity in luminance profile in the range of the distribution of contour shape from the training data in the dictionary 20.

Subsequently, the first calculating unit 16 extracts the contour shape data having the highest similarity as a data which represents the myocardial boundary contour of the diagnostic heart in the diagnostic image.

Finally, the output unit 18 outputs the extracted contour shape data (Step 6 in FIG. 2).

As described thus far, according to the first embodiment, an adequate result of myocardial segmentation according to the entry of the user even when the anatomical features are not clear on the diagnostic image by using the training of the contour shape using the three training positions and the extraction of the contour by specifying the positions of the three points. Accordingly, significant advantages are achieved in terms of simplification of the user operation such as specification of interested area according to the first embodiment.

Second Embodiment

Figure 6:
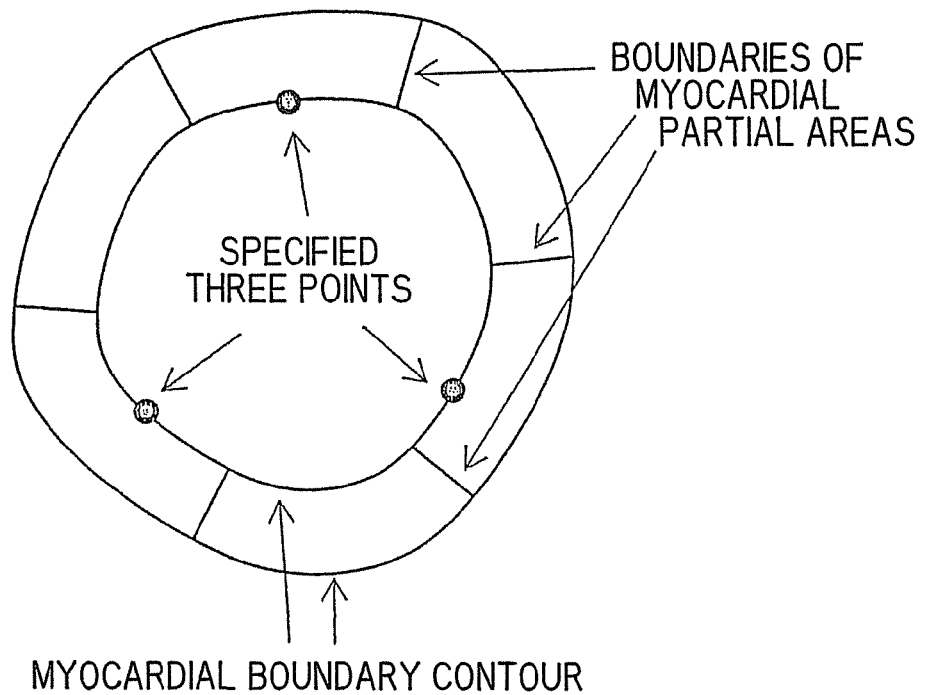
FIG. 6 is a drawing for explaining simultaneous extraction of a myocardial contour and the positions of boundaries of partial areas according to a second embodiment.

Referring now to FIG. 6, the image processing apparatus 10 according to a second embodiment will be described.

According to the second embodiment, the myocardial segmentation and the positional specification of the partial area boundaries are achieved simultaneously by specifying the positions of the three points by training also the positions of the myocardial partial area boundaries in advance at the time of training the myocardial contour shape (see FIG. 6).

The term "myocardial partial areas" represents areas which are used anatomically, and includes, for example, areas referred to as "anterior wall of heart base" or "posterior wall of heart base".

A training process will now be described.

For the training process of the myocardial contour shape, the training contour shape data, the training image, and the training partial area boundary position data are used.

In the same manner as the first embodiment, the user specifies three training positions so as to be similar to a like figure of the specified reference triangle for each of the plurality of training images of the training hearts using the position specifying unit 12.

Subsequently, the first calculating unit 16 obtains a coordinate conversion expression which makes the three training positions overlap with the positions of the vertexes of the normalization triangle. Then, the first calculating unit 16 converts the coordinates of the training contour shape data and the training partial area boundary position data by the coordinate conversion expression. Then, the first calculating unit 16 learns the contour shape and the partial boundary positions together.

More specifically, the contour shape data and the partial boundary position data are also the vertex coordinate data. Therefore, the first calculating unit 16 arranges the coordinate data as a vector and uses the same for training. The training data created by training includes the contour shape data (distribution of contour shape and luminance profile) and the partial area boundary position data.

Subsequently, the myocardial segmentation will be described.

The first calculating unit 16 extracts the myocardial boundary contour and the positions of the myocardial partial area boundaries from the three diagnostic positions specified by the position specifying unit 12, the diagnostic image, and the training data in the dictionary 20.

First of all, the first calculating unit 16 obtains a coordinate conversion expression which makes the specified three diagnostic positions overlap with the positions of the vertexes of the normalization triangle used at the time of training as in the case of the first embodiment.

Then, the first calculating unit 16 converts the contour shape data in the training data into coordinates on the diagnostic image by the coordinate reverse conversion expression.

Subsequently, the first calculating unit 16 evaluates the similarity between the luminance profile around the contour in the diagnostic image and the luminance profile in the dictionary 20.

Subsequently, the first calculating unit 16 performs the same process for each of the plurality of training images.

Then, the first calculating unit 16 searches a contour shape data having the highest similarity in luminance profile in the range of the distribution of contour shape in the training data in the dictionary 20. Accordingly, the first calculating unit 16 is able to extract the myocardial boundary contour.

Then, the first calculating unit 16 reads out the partial area boundary position data stored in pair with the extracted contour shape, so that the positions of the partial area boundaries are obtained.

In this configuration, according to the second embodiment, the myocardial segmentation and the positional specification of the partial area boundaries are achieved simultaneously by specifying the positions of the same three points by training also the positions of the myocardial partial area boundaries in advance. Accordingly, further significant advantages are achieved in terms of simplification of the user operation such as specification of interested area according to the second embodiment.

Third Embodiment

Figure 8:
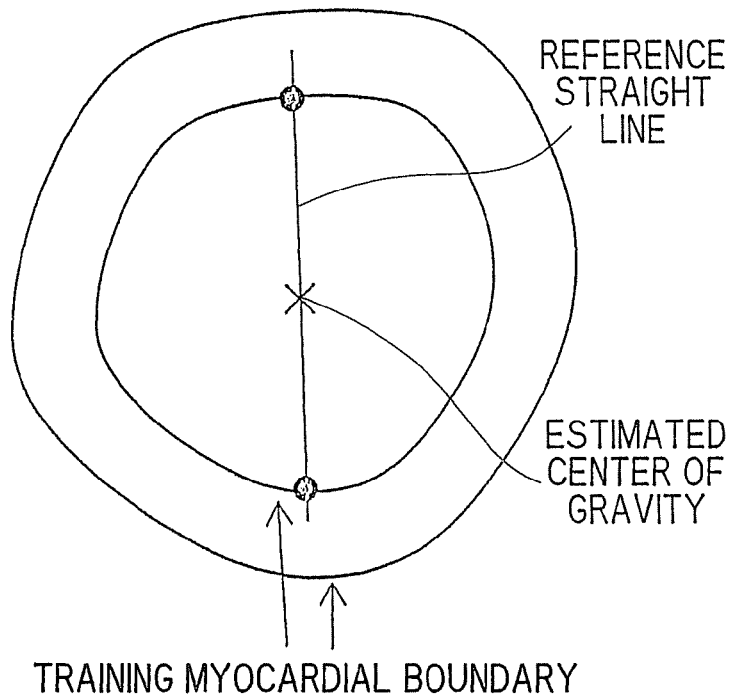
FIG. 8 is a drawing for explaining two-point specification in the short-axis image of the heart according to a third embodiment.

Referring now to FIG. 8, the image processing apparatus 10 according to a third embodiment will be described.

In the third embodiment, the myocardial segmentation is performed by specifying the positions of two points on the contour using a reference straight line instead of the reference triangle.

Different points of the image processing apparatus 10 from the above-described embodiments will be mainly described.

A training process which is to be performed in advance will be described.

In this training process, a reference straight line which indicates the inclination of the straight line passing through the two points specified on the myocardial boundary is specified. For example, when specifying the uppermost point and the lowermost point on the contour, the reference straight line is determined to be a vertical straight line.

First of all, when the reference straight line is arranged so as to pass through an estimated center of gravity of the training myocardial area for each of the plurality of training images of an training heart, two points which intersect the boundary of the myocardial area (that is, points at both ends of the reference straight line) are employed as the two training positions. Therefore, the user specifies these two points by the position specifying unit 12 (see FIG. 8). The two training positions do not have to be the anatomical features.

Subsequently, the first calculating unit 16 uses at least the two training positions and the training myocardial area boundary data and prepares the training data. The first calculating unit 16 uses the coordinates of the two training positions to obtain a coordinate conversion expression which makes the distance between these two points a unit length on the normalization straight line, performs the normalization process to learn the contour shape, and creates the training data of the dictionary 20.

The term "normalization straight line" has the same concept as the reference triangle, which is a different concept from the reference straight line. The normalization straight line is a concept generated for facilitating comparison by normalizing a diagnostic image, described later, and the training image when obtaining the similarity of these images. This normalization straight line is composed of the two coordinate positions present in a virtual normalization coordinate system.

Subsequently, the myocardial segmentation will be described.

First of all, the user specifies two diagnostic positions which intersect the myocardial boundary when the predetermined reference straight line is arranged at an estimated center of gravity of the myocardial area using the position specifying unit 12.

Subsequently, the first calculating unit 16 obtains a coordinate conversion expression which makes the distance between these two points correspond to the unit length on the normalization straight line.

Then, the first calculating unit 16 converts the contour shape data in the training data into coordinates on the diagnostic image by the coordinate reverse conversion expression.

Subsequently, the first calculating unit 16 obtains the similarity between the luminance profile around the contour in the diagnostic image and the luminance profile of the training data.

Then, the first calculating unit 16 searches a contour shape of the training image having the highest similarity in luminance profile in the range of distribution of the contour shape from the training data. Accordingly, the first calculating unit 16 extracts the myocardial boundary contour.

In this configuration, according to the third embodiment, the width of variation in shape during the training is increased, and hence is disadvantageous in accuracy by using the straight line as the reference graphic and performing the myocardial segmentation by the entry of two points. However, in contrast, the number of points to be specified may be reduced. According to the third embodiment, the myocardial segmentation is achieved by the entry of small number, that is, two points also in the case in which there is no anatomical features present in the cross-sectional image.

(Modification)

The invention is not limited to the embodiments shown above, and components may be modified and embodied without departing from the scope of the invention in the stage of implementation. Also, by combining the plurality of adequate components disclosed in the embodiments shown above, various modes of the invention are achieved. For example, some components may be eliminated from all the components disclosed in the embodiments.

Figure 7:
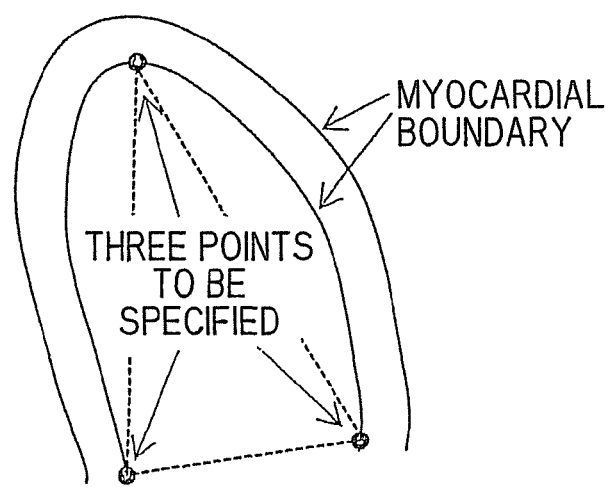
FIG. 7 is a drawing for explaining an exemplary of the three-point specification in a long-axis cross-sectional image of a heart according to a modification.

For example, in the description of the embodiments shown above, the example used for the short-axis cross-sectional image of the heart has been described. However, the invention is not limited to the short-axis cross-sectional image. For example, by specifying three points as shown in FIG. 7 for the long-axis cross-sectional image, the same advantages are achieved.

In this case, a switching unit which switches the graphics between the reference triangle and the reference straight line for each cross-sectional categories of the heart (long-axis cross-sectional image, short-axis cross-sectional image) may be provided.

What is claimed is:

1. An image processing apparatus comprising:
a dictionary configured to store training data, the training data being data relating to each of a plurality of training images of an training heart and including training myocardial area boundary data of the training hearts, the training myocardial area boundary data being data corresponding to three training positions which are specified on a myocardial boundary of the training heart, and the three training positions having a relation with positions of three vertexes of a predetermined reference triangle;
an image input unit configured to enter a diagnostic image of a diagnostic heart;
a first position specifying unit configured to specify three diagnostic positions corresponding to the respective vertexes of the reference triangle so as to be similar to a like figure of the reference triangle on the myocardial boundary of the diagnostic hearts in the diagnostic image;
a first calculating unit configured to obtain a similarity by matching the three training positions of each of the plurality of training images and the three diagnostic positions and comparing the diagnostic image and the training myocardial area boundary data; and
an output unit configured to output the training myocardial area boundary data having the highest similarity as a myocardial area boundary data of the diagnostic heart.

2. An image processing apparatus comprising:
a dictionary configured to store training data, the training data being data relating to each of a plurality of training images of an training heart and including training myocardial area boundary data of the training hearts, the training myocardial area boundary data being data corresponding to two training positions which are specified on a myocardial boundary of the training heart, and the two training positions having a relation with positions of both ends of a predetermined reference straight line;
an image input unit configured to enter a diagnostic image of a diagnostic heart;
a first position specifying unit configured to specify two diagnostic positions corresponding to the reference straight line on the myocardial boundary of the diagnostic hearts in the diagnostic image;
a first calculating unit configured to obtain a similarity by matching the two training positions of each of the plurality of training images and the two diagnostic positions and comparing the diagnostic image and the training myocardial area boundary data; and
an output unit configured to output the training myocardial area boundary data having the highest similarity as myocardial area boundary data of the diagnostic heart.

3. The apparatus according to claim 1, further comprising:
a second position specifying unit configured to specify the three training positions on the myocardial boundary of the training heart so as to be similar to a like figure of the reference triangle on the training images; and
a second calculating unit configured to extract the training myocardial area boundary data of the training heart corresponding to the three training positions from the training images and store the same in the dictionary.

4. The apparatus according to claim 2, further comprising:
a second position specifying unit configured to specify the two training positions on the myocardial boundary of the training heart so as to correspond to the reference straight line on the training images; and
a second calculating unit configured to extract the training myocardial area boundary data of the training heart corresponding to the two training positions from the training images and store the same in the dictionary.

5. The apparatus according to claim 1, wherein the respective training data stored in the dictionary includes myocardial contour shape data and myocardial partial area boundary data of the training heart, and
the output unit outputs a myocardial boundary shape and boundary positions of myocardial partial areas of the diagnostic heart on the basis of the myocardial contour shape data and the myocardial partial area boundary data corresponding to the training myocardial area boundary data having the highest similarity.

6. The apparatus according to claim 2, wherein the respective training data stored in the dictionary includes myocardial contour shape data and myocardial partial area boundary data of the training heart, and
the output unit outputs the myocardial boundary shape and the boundary positions of the myocardial partial areas of the diagnostic heart on the basis of the myocardial contour shape data and the myocardial partial area boundary data corresponding to the training myocardial area boundary data having the highest similarity.

7. The apparatus according to claim 1, wherein when the diagnostic image is a short-axis cross-sectional image of a heart, the three diagnostic positions specified by the first position specifying unit is one of the uppermost position, the lowermost position, the rightmost position, and the leftmost position on the myocardial boundary in the image coordinate system of the diagnostic image, and other two points on the myocardial boundary.

8. The apparatus according to claim 1, wherein the myocardial area boundary data indicates the shapes of inner and outer myocardial boundary contours.

9. The apparatus according to claim 2, wherein the myocardial area boundary data indicates the shapes of inner and outer myocardial boundary contours.

10. The apparatus according to claim 1, comprising: a switching unit configured to switch between different triangles so as to specify one of the triangles as the reference triangle according to each of the cross-sectional categories of the heart.

11. The apparatus according to claim 2, comprising: a switching unit configured to switch between different triangles so as to specify one of the straight lines as the reference straight line according to each of the cross-sectional categories of the heart.

12. An image processing method comprising the steps of:
storing training data being data relating to each of a plurality of training images of an training heart and including training myocardial area boundary data of the training hearts in a dictionary, the training myocardial area boundary data being data corresponding to three training positions which are specified on a myocardial boundary of the training heart, and the three training positions having a relation with positions of three vertexes of a predetermined reference triangle;
entering the diagnostic image of the diagnostic heart;
specifying three diagnostic positions corresponding to the respective vertexes of the reference triangle so as to be similar to a like figure of the reference triangle on the myocardial boundary of the diagnostic hearts in the diagnostic image;
obtaining a similarity by matching the three training positions of each of the plurality of training images and the three diagnostic positions and comparing the diagnostic image and the training myocardial area boundary data; and
outputting the training myocardial area boundary data having the highest similarity as a myocardial area boundary data of the diagnostic heart.

13. An image processing method comprising the steps of;
storing training data being data relating to each of a plurality of training images of an training heart and including training myocardial area boundary data of the training hearts in a dictionary, the training myocardial area boundary data being data corresponding to two training positions which are specified on a myocardial boundary of the training heart, and the two training positions having a relation with positions of both ends of a predetermined reference straight line;
entering the diagnostic image of the diagnostic heart;
specifying two diagnostic positions corresponding to the reference straight line on the myocardial boundary of the diagnostic hearts in the diagnostic image;
obtaining a similarity by matching the two training positions of each of the plurality of training images and the two diagnostic positions and comparing the diagnostic image and the training myocardial area boundary data; and
outputting the training myocardial area boundary data having the highest similarity as myocardial area boundary data of the diagnostic heart.

\* \* \* \* \*